United States Patent [19]
Hasegawa

[11] Patent Number: 5,495,231
[45] Date of Patent: Feb. 27, 1996

[54] METALLIC GLASS ALLOYS FOR MECHANICALLY RESONANT MARKER SURVEILLANCE SYSTEMS

[75] Inventor: Ryusuke Hasegawa, Morristown, N.J.

[73] Assignee: AlliedSignal Inc., Morris Township, N.J.

[21] Appl. No.: 421,109

[22] Filed: Apr. 13, 1995

[51] Int. Cl.$^6$ ................................................ G08B 13/74
[52] U.S. Cl. ........................ 340/551; 148/304; 148/403; 420/119; 420/121; 420/435
[58] Field of Search ........................... 340/551; 420/435, 420/121, 119; 148/304, 403

[56] References Cited

U.S. PATENT DOCUMENTS

| | | | |
|---|---|---|---|
| 4,142,571 | 3/1979 | Narasimhan | 164/463 |
| 4,152,144 | 5/1979 | Hasegawa et al. | 148/304 |
| 4,510,489 | 4/1985 | Anderson, III et al. | 340/551 |
| 4,510,490 | 4/1985 | Anderson, III et al. | 340/551 |

*Primary Examiner*—Glen Swann, III
*Attorney, Agent, or Firm*—Ernest D. Buff

[57] ABSTRACT

A glassy metal alloy consists essentially of the formula $Co_aFe_bNi_cM_dB_e Si_fC_g$, where M is selected from molybdenum and "a", "b", "c", "d", "e", "f" and "g" are in atom percent, "a" ranges from about 40 to about 43, "b" ranges from about 35 to about 42 and "c" ranges from 0 to about 5, "d" ranges from 0 to about 3, "e" ranges from about 10 to about 25, "f" ranges from 0 to about 15 and "g" ranges from 0 to about 2. The alloy can be cast by rapid solidification into ribbon or otherwise formed into a marker that is especially suited for use in magneto-mechanically actuated article surveillance systems. Advantageously, the marker is characterized by relatively linear magnetization response in the frequency regime wherein harmonic marker systems operate magnetically. Voltage amplitudes detected for the marker are high, and interference between surveillance systems based on mechanical resonance and harmonic re-radiance is virtually eliminated.

18 Claims, 2 Drawing Sheets

METALLIC GLASS ALLOYS FOR MECHANICALLY RESONANT MARKER SURVEILLANCE SYSTEMS

BACKGROUND OF THE INVENTION

1. Field of the Invention

This invention relates to metallic glass alloys; and more particularly to metallic glass alloys suited for use in mechanically resonant markers of article surveillance systems.

2. Description of the Prior Art

Numerous article surveillance systems are available in the market today to help identify and/or secure various animate and inanimate objects. Identification of personnel for controlled access to limited areas, and securing articles of merchandise against pilferage are examples of purposes for which such systems are employed.

An essential component of all surveillance systems is a sensing unit or "marker", that is attached to the object to be detected. Other components of the system include a transmitter and a receiver that are suitably disposed in an "interrogation" zone. When the object carrying the marker enters the interrogation zone, the functional part of the marker responds to a signal from the transmitter, which response is detected in the receiver. The information contained in the response signal is then processed for actions appropriate to the application: denial of access, triggering of an alarm, and the like.

Several different types of markers have been disclosed and are in use. In one type, the functional portion of the marker consists of either an antenna and diode or an antenna and capacitors forming a resonant circuit. When placed in an electromagnetic field transmitted by the interrogation apparatus, the antenna-diode marker generates harmonics of the interrogation frequency in the receiving antenna. The detection of the harmonic or signal level change indicates the presence of the marker. With this type of system, however, reliability of the marker identification is relatively low due to the broad bandwidth of the simple resonant circuit. Moreover, the marker must be removed after identification, which is not desirable in such cases as antipilferage systems.

A second type of marker consists of a first elongated element of high magnetic permeability ferromagnetic material disposed adjacent to at least a second element of ferromagnetic material having higher coercivity than the first element. When subjected to an interrogation frequency of electromagnetic radiation, the marker generates harmonics of the interrogation frequency due to the non-linear characteristics of the marker. The detection of such harmonics in the receiving coil indicates the presence of the marker. Deactivation of the marker is accomplished by changing the state of magnetization of the second element, which can be easily achieved, for example, by passing the marker through a dc magnetic field. Harmonic marker systems are superior to the aforementioned radio-frequency resonant systems due to improved reliability of marker identification and simpler deactivation method. Two major problems, however, exist with this type of system: one is the difficulty of detecting the marker signal at remote distances. The amplitude of the harmonics generated by the marker is much smaller than the amplitude of the interrogation signal, limiting the detection aisle widths to less than about three feet. Another problem is the difficulty of distinguishing the marker signal from pseudo signals generated by other ferromagnetic objects such as belt buckles, pens, clips, etc.

Surveillance systems that employ detection modes incorporating the fundamental mechanical resonance frequency of the marker material are especially advantageous systems, in that they offer a combination of high detection sensitivity, high operating reliability, and low operating costs. Examples of such systems are disclosed in U.S. Pat. Nos. 4,510,489 and 4,510,490 (hereinafter the '489 and '490 patents).

The marker in such systems is a strip, or a plurality of strips, of known length of a ferromagnetic material, packaged with a magnetically harder ferromagnet (material with a higher coercivity) that provides a biasing field to establish peak magneto-mechanical coupling. The ferromagnetic marker material is preferably a metallic glass alloy ribbon, since the efficiency of magneto-mechanical coupling in these alloys is very high. The mechanical resonance frequency of the marker material is dictated essentially by the length of the alloy ribbon and the biasing field strength. When an interrogating signal tuned to this resonance frequency is encountered, the marker material responds with a large signal field which is detected by the receiver. The large signal field is partially attributable to an enhanced magnetic permeability of the marker material at the resonance frequency. Various marker configurations and systems for the interrogation and detection that utilize the above principle have been taught in the '489 and '490 patents.

In one particularly useful system, the marker material is excited into oscillations by pulses, or bursts, of signal at its resonance frequency generated by the transmitter. When the exciting pulse is over, the marker material will undergo damped oscillations at its resonance frequency, i.e., the marker material "rings down" following the termination of the exciting pulse. The receiver "listens" to the response signal during this ring down period. Under this arrangement, the surveillance system is relatively immune to interference from various radiated or power line sources and, therefore, the potential for false alarms is essentially eliminated.

A broad range of alloys have been claimed in the '489 and '490 patents as suitable for marker material for the various detection systems disclosed. Other metallic glass alloys bearing high permeability are disclosed in U.S. Pat. No. 4,152,144.

A major problem in use of electronic article surveillance systems is the tendency for markers of surveillance systems based on mechanical resonance to accidentally trigger detection systems that are based an alternate technology, such as the harmonic marker systems described above: The non-linear magnetic response of the marker is strong enough to generate harmonics in the alternate system, thereby accidentally creating a pseudo response, or "false" alarm. The importance of avoiding interference among, or "pollution" of, different surveillance systems is readily apparent. Consequently, there exists a need in the art for a resonant marker that can be detected in a highly reliable manner without polluting systems based on alternate technologies, such as harmonic re-radiance.

SUMMARY OF INVENTION

The present invention provides magnetic alloys that are at least 70% glassy and are characterized by relatively linear magnetic responses in a frequency regime wherein harmonic marker systems operate magnetically. Such alloys can be cast into ribbon using rapid solidification, or otherwise formed into markers having magnetic and mechanical characteristics especially suited for use in surveillance systems based on magneto-mechanical actuation of the markers.

Generally stated the glassy metal alloys of the present invention have a composition consisting essentially of the formula $Co_aFe_bNi_cM_dB_eSi_fC_g$, where M is selected from molybdenum and chromium and "a", "b", "c", "d", "e", "f" and "g" are in atom percent, "a" ranges from about 40 to about 43, "b" ranges from about 35 to about 42 and "c" ranges from about 0 to about 5, "d" ranges from about 0 to about 3, "e" ranges from about 10 to about 25, "f" ranges from about 0 to about 15 and "g" ranges from about 0 to about 2. Ribbons of these alloys, when mechanically resonant at frequencies ranging from about 48 to about 66 kHz, evidence relatively linear magnetization behavior up to an applied field exceeding 8 Oe as well as the slope of resonant frequency versus bias field close to or exceeding the level of about 400 Hz/Oe exhibited by a conventional mechanical-resonant marker. Moreover, voltage amplitudes detected at the receiving coil of a typical resonant-marker system are higher for the markers made from the alloys of the present invention than those of the existing resonant marker. These features assure that interference among systems based on mechanical resonance and harmonic reradiance is avoided The metallic glasses of this invention are especially suitable for use as the active elements in markers associated with article surveillance systems that employ excitation and detection of the magneto-mechanical resonance described above. Other uses may be found in sensors utilizing magneto-mechanical actuation and its related effects and in magnetic components requiring high magnetic permeability.

BRIEF DESCRIPTION OF THE DRAWINGS

The invention will be more fully understood and further advantages will become apparent when reference is made to the following detailed description of the preferred embodiments of the invention and the accompanying drawings in which.

DESCRIPTION OF THE PREFERRED EMBODIMENTS

Figure 1A:
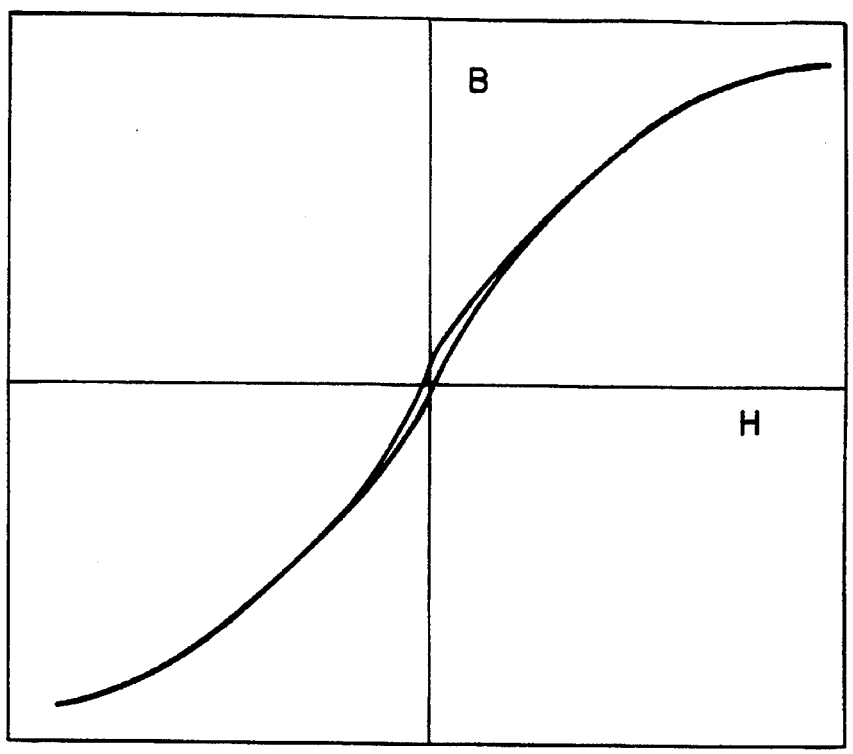
FIG. 1(a) is a schematic representation of the magnetization curve taken along the length of a existent resonant marker, where B is the magnetic induction and H is the applied magnetic field.

In accordance with the present invention, there are provided magnetic metallic glass alloys that are characterized by relatively linear magnetic responses in the frequency region where harmonic marker systems operate magnetically. Such alloys evidence all the features necessary to meet the requirements of markers for surveillance systems based on magneto-mechanical actuation. Generally stated the glassy metal alloys of the present invention have a composition consisting essentially of the formula $Co_aFe_bNi_cM_dB_eSi_fC_g$, where M is selected from molybdenum and chromium and "a", "b", "c", "d", "e", "f" and "g" are in atom percent, "a" ranges from about 40 to about 43, "b" ranges from about 35 to about 42 and "c" ranges from about 0 to about 5, "d" ranges from about 0 to about 3, "e" ranges from about 10 to about 25, "f" ranges from about 0 to about 15 and "g" ranges from about 0 to about 2. The purity of the above compositions is that found in normal commercial practice. Ribbons of these alloys are annealed with a magnetic field applied across the width of the ribbons at elevated temperatures below alloys' crystallization temperatures for a given period of time. The field strength during the annealing is such that the ribbons saturate magnetically along the field direction. Annealing time depends on the annealing temperature and typically ranges from about a few minutes to a few hours. For commercial production, a continuous reel-to-reel annealing furace may be preferred. In such cases, ribbon travelling speeds may be set at about one meter per minute. The annealed ribbons having, for example, a length of about 38 mm, exhibit relatively linear magnetic response for magnetic fields up to or more than 8 Oe applied parallel to the marker length direction and mechanical resonance in a range of frequencies from about 48 kHz to about 66 kHz. The linear magnetic response region extending to the level of more than 8 Oe is sufficient to avoid triggering most of the harmonic marker systems. The annealed ribbons at lengths shorter or longer than 38 mm evidence higher or lower mechanical resonance frequencies than 48–66 kHz range.

Ribbons having mechanical resonance in the range from about 48 to 60 kHz are preferred. Such ribbons are short enough to be used as disposable marker materials. In addition, the resonance signals of such ribbons are well separated from the audio and commercial radio frequency ranges.

Most metallic glass alloys that are outside of the scope of this invention typically exhibit nonlinear magnetic response regions below about 8 Oe level. Resonant markers composed of these alloys accidentally trigger, and thereby pollute, many article detection systems of the harmonic reradiance variety.

There are a few metallic glass alloys outside of the scope of this invention that do show linear magnetic response for an acceptable field range. These alloys, however, contain high levels of molybdenum or chromium, resulting in increased raw material costs and reduced ribbon castability owing to the higher melting temperatures. The alloys of the present invention are advantageous, in that they afford, in combination, extended linear magnetic response, improved mechanical resonance performance, good ribbon castability and economy in production of usable ribbon.

Apart from the avoidance of the interference among different systems, the markers made from the alloys of the present invention generate larger signal amplitudes at the receiving coil than conventional mechanical resonant markers. This makes it possible to reduce either the size of the marker or increase the detection aisle widths, both of which are desirable features of article surveillance systems.

Examples of metallic glass alloys of the invention include $Co_{42}Fe_{40}B_{11}Si_7$, $Co_{42}Fe_{40}B_{12}Si_6$, $Co_{42}Fe_{40}B_{13}Si_5$, $Co_{42}Fe_{40}B_{14}Si_4$, $Co_{42}Fe_{40}B_{15}Si_3$, $Co_{42}Fe_{40}B_{16}Si_2$, $Co_{42}Fe_{40}B_{17}Si_1$, $Co_{42}Fe_{40}B_{13}Si_3C_2$, $Co_{40}Fe_{40}Ni_2B_{13}Si_5 Co_{40}Fe_{38}Ni_4B_{13}Si_5$, $Co_{41}Fe_{40}Mo_1B_{13}Si_5$, $Co_{41}Fe_{38}Mo_3B_{13}Si_5$, $Co_{41}Fe_{40}Cr_1B_{13}Si_5$, $Co_{41}Fe_{38}Cr_3B_{13}Si_5$, and $Co_{43}Fe_{35}Ni_3B_{13}Si_4C_2$, wherein subscripts are in atom percent.

The magnetization behavior characterized by a B-H curve is shown in FIG. 1(a) for a conventional mechanical resonant marker, where B is the magnetic induction and H is the applied field. The overall B-H curve is sheared with a non-linear hysteresis loop existent in the low field region. This non-linear feature of the marker results in higher harmonics generation, which triggers some of the harmonic marker systems, hence the interference among different article surveillance systems.

Figure 1B:
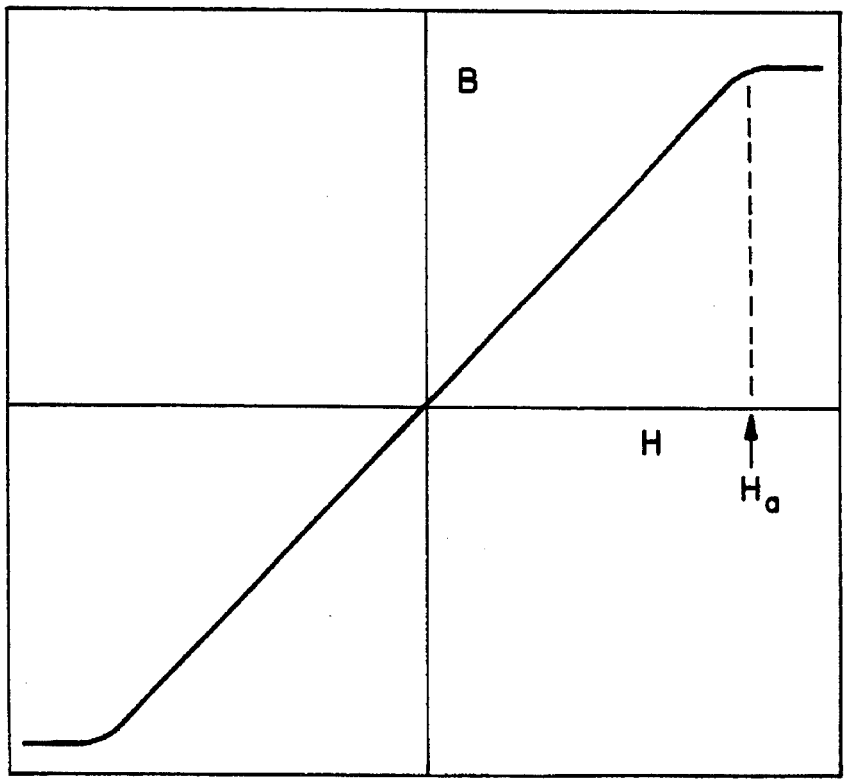
FIG. 1(b) is a schematic representation of the magnetization curve taken along the length of the marker of the present invention, where $H_a$ is a field above which B saturates.

The definition of the linear magnetic response is given in FIG. 1 (b). As a marker is magnetized along the length direction by an external magnetic field, H, the magnetic induction, B, results in the marker. The magnetic response is relatively linear up to $H_a$, beyond which the marker saturates magnetically. The quantity $H_a$ depends on the physical dimension of the marker and its magnetic anisotropy field. To prevent the resonant marker from accidentally triggering a surveillance system based on harmonic re-radiance, $H_a$ should be above the operating field intensity region of the harmonic marker systems.

Figure 2:
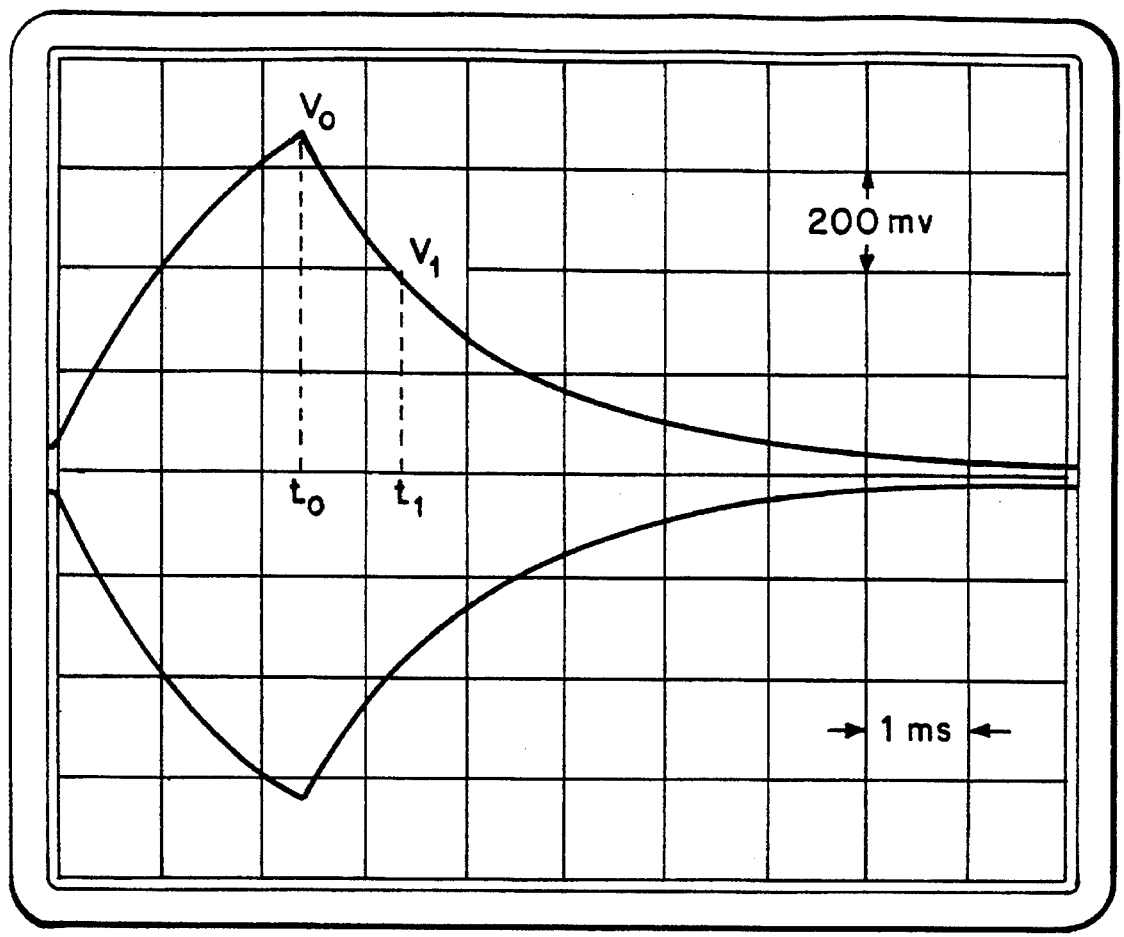
FIG. 2 is a schematic representation of signal profile detected at the receiving coil depicting mechanical resonance excitation, termination of excitation at time $t=t_o$ and subsequent ring-down, where $V_o$ and $V_1$ are the signal amplitudes at the receiving coil at $t=t_o$ and $t=t_1$ (1 msec after $t_o$), respectively.

The marker material is exposed to a burst of exciting signal of constant amplitude, referred to as the exciting pulse, tuned to the frequency of mechanical resonance of the marker material. The marker material responds to the exciting pulse and generates output signal in the receiving coil following the curve leading to $V_o$ in FIG. 2. At time $t_o$, excitation is terminated and the marker starts to ring-down, reflected in the output signal which is reduced from $V_o$ to zero over a period of time. At time $t_1$, which is 1 msec after the termination of excitation, output signal is measured and denoted by the quantity $V_1$. Thus $V_1/V_o$ is a measure of the ring-down. Although the principle of operation of the surveillance system is not dependent on the shape of the waves comprising the exciting pulse, the wave form of this signal is usually sinusoidal. The marker material resonates under this excitation.

The physical principle governing this resonance may be summarized as follows: When a ferromagnetic material is subjected to a magnetizing magnetic field, it experiences a change in length. The fractional change in length, over the original length, of the material is referred to as magnetostriction and denoted by the symbol λ. A positive signature is assigned to λ if an elongation occurs parallel to the magnetizing magnetic field.

When a ribbon of a material with a positive magnetostriction is subjected to a sinusoidally varying external field, applied along its length, the ribbon will undergo periodic changes in length, i.e., the ribbon will be driven into oscillations. The external field may be generated, for example, by a solenoid carrying a sinusoidally varying current. When the half-wave length of the oscillating wave of the ribbon matches the length of the ribbon, mechanical resonance results. The resonance frequency $f_r$ is given by the relation $$f_r = (\tfrac{1}{2}L)(E/D)^{0.5},$$

where L is the ribbon length, E is the Young's modulus of the ribbon, and D is the density of the ribbon.

Figure 3:
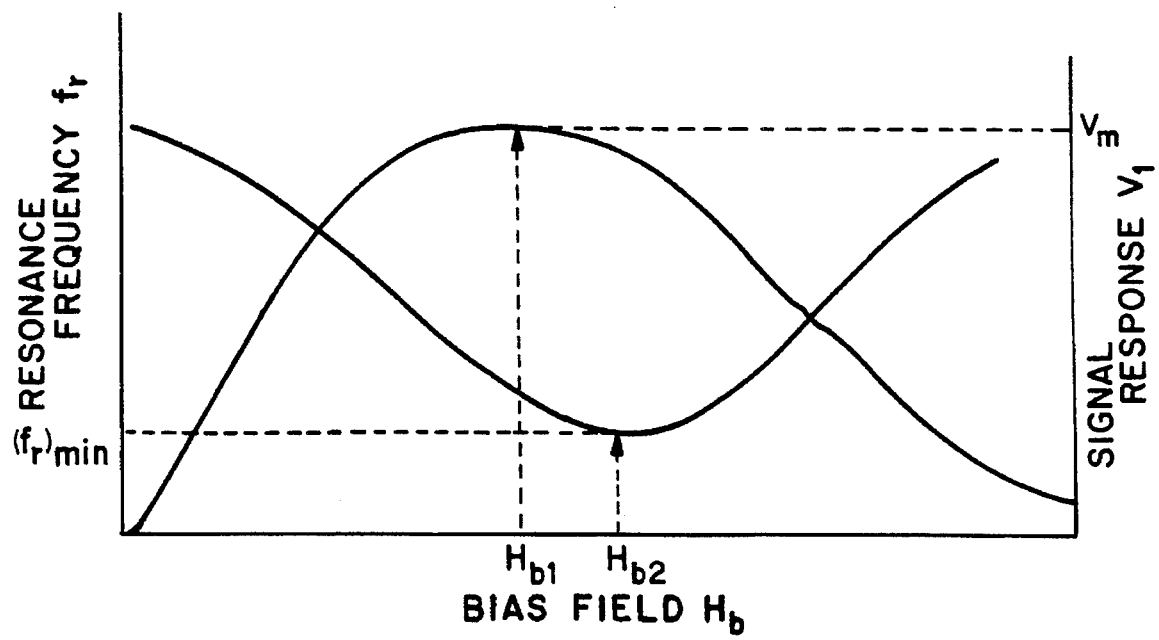
FIG. 3 is a schematic representation of the mechanical resonance frequency, $f_r$, and response signal, $V_1$, detected in the receiving coil at 1 msec after the termination of the exciting ac field as a function of the bias magnetic field, $H_b$, where $H_{b1}$ and $H_{b2}$ are the bias fields at which $V_1$ is a maximum and $f_R$ is a minimum, respectively.

Magnetostrictive effects are observed in a ferromagnetic material only when the magnetization of the material proceeds through magnetization rotation. No magnetostriction is observed when the magnetization process is through magnetic domain wall motion. Since the magnetic anisotropy of the marker of the alloy of the present invention is induced by field-annealing to be across the marker width direction, a dc magnetic field, referred to as bias field, applied along the marker length direction improves the efficiency of magneto-mechanical response from the marker material. It is also well understood in the art that a bias field serves to change the effective value for E, the Young's modulus, in a ferromagnetic material so that the mechanical resonance frequency of the material may be modified by a suitable choice of the bias field strength. The schematic representation of FIG. 3 explains the situation further: The resonance frequency, $f_r$, decreases with the bias field, $H_b$, reaching a minimum, $(f_r)_{min}$, at $H_{b2}$. The signal response, $V_1$, detected, say at $t=t_1$ at the receiving coil, increases with $H_{b2}$, reaching a maximum, $V_m$, at $H_{b1}$. The slope, $df_r/dH_b$, near the operating bias field is an important quantity, since it related to the sensitivity of the surveillance system.

Summarizing the above, a ribbon of a positively magnetostrictive ferromagnetic material, when exposed to a driving ac magnetic field in the presence of a dc bias field, will oscillate at the frequency of the driving ac field, and when this frequency coincides with the mechanical resonance frequency, $f_r$, of the material, the ribbon will resonate and provide increased response signal amplitudes. In practice, the bias field is provided by a ferromagnet with higher coercivity than the marker material present in the "marker package".

Table I lists typical values for $V_m$, $H_{b1}$, $(f_r)_{min}$ and $H_{b2}$ for a conventional mechanical resonant marker based on glassy $Fe_{40}Ni_{38}Mo_4B_{18}$. The low value of $H_{b2}$, in conjunction with the existence of the nonlinear B-H behavior below $H_{b2}$, tends to cause a marker based on this alloy to accidentally trigger some of the harmonic marker systems, resulting in interference among article surveillance systems based on mechanical resonance and harmonic re-radiance.

TABLE I

Typical values for $V_m$, $H_{b1}$, $(f_r)_{min}$ and $H_{b2}$ for a conventional mechanical resonant marker based on glassy $Fe_{40} Ni_{38} Mo_4 B_{18}$. This ribbon at a length of 38.1 mm has mechanical resonance frequencies ranging from about 57 and 60 kHz.

| $V_m$ (mV) | $H_{b1}$ (Oe) | $(f_r)_{min}$ (kHz) | $H_{b2}$ (Oe) |
|---|---|---|---|
| 150–250 | 4–6 | 57–58 | 5–7 |

Table II lists typical values for $H_a$, $V_m$, $H_{b1}$, $(f_r)_{min}$, $H_{b2}$ and $df_r/dH_b H_b$ for the alloys outside the scope of this patent. Field-annealing was performed in a continuous reel-to-reel furnace on 12.7 mm wide ribbon where ribbon speed was from about 0.6 m/min. to about 1.2 m/min.

TABLE II

Values for $H_a$, $V_m$, $H_{b1}$, $(f_r)_{min}$, $H_{b2}$ and $df_r/dH_b$ taken at $H_b = 6$ Oe for the alloys outside the scope of this patent. Field-annealing was performed in a continuous reel-to-reel furnace where ribbon speed was from about 0.6 m/min. to about 1.2 m/min and ribbon temperature was about 380° C. The annealing field was about 1.4 kOe applied across the ribbon width.

| Composition (at. %) | $H_a$ (Oe) | $V_m$ (mV) | $H_{b1}$ (Oe) | $(f_r)_{min}$ (kHz) | $H_{b2}$ (Oe) | $df_r/dH_b$ (Hz/Oe) |
|---|---|---|---|---|---|---|
| A. $Co_{42} Fe_{35} Mo_5 B_{13} Si_5$ | 11 | 70 | 4.5 | 59 | 7.5 | 900 |

Alloy A shows not only an unacceptable magnetomechanical resonance responses but contains a high level of molybdenum, resulting in increased raw material costs and reduced ribbon castability.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLES

Example 1: Co—Fe—B—Si—C Metallic Glasses

1. Sample Preparation

Glassy metal alloys in the Co—Fe—B—Si—C series, designated as samples No. 1 to 8 in Table III and IV, were rapidly quenched from the melt following the techniques taught by Narasimhan in U.S. Pat. No. 4,142,571, the disclosure of which is hereby incorporated by reference thereto. All casts were made in an inert gas, using 100 g melts. The resulting ribbons, typically 25 μm thick and about 12.7 mm wide, were determined to be free of significant crystallinity by x-ray diffractometry using Cu—Kα radiation and differential scanning calorimetry. Each of the alloys was at least 70% glassy and, in many instances, the alloys were more than 90% glassy. Ribbons of these glassy metal alloys were strong, shiny, hard and ductile.

The ribbons were cut into small pieces for magnetization, magnetostriction, Curie and crystallization temperature and density measurements. The ribbons for magneto-mechanical resonance characterization were cut to a length of about 38.1 mm and were heat treated with a magnetic field applied across the width of the ribbons.

2. Characterization of magnetic and thermal properties

Table III lists saturation induction ($B_s$), saturation magnetostriction ($\lambda_s$), crystallization temperature ($T_c$) of the alloys. Magnetization was measured by a vibrating sample magnetometer, giving the saturation magnetization value in emu/g which is converted to the saturation induction. Saturation magnetostriction was measured by a strain-gauge method giving in $10^{-6}$ or in ppm. Curie and crystallization temperatures were measured by an inductance method and a differential scanning calorimetry, respectively.

TABLE III

Magnetic and thermal properties of Co-Fe-B-Si-C glassy alloys. Curie temperatures of these alloys are above the crystallization temperatures and are not listed.

| No. | Composition (at. %) | | | | | $B_s$ (Tesla) | $\lambda_s$ (ppm) | $T_c$ (°C.) |
|---|---|---|---|---|---|---|---|---|
| | Co | Fe | B | Si | C | | | |
| 1 | 42 | 40 | 11 | 7 | — | 1.56 | 26 | 451 |
| 2 | 42 | 40 | 12 | 6 | — | 1.55 | 26 | 456 |
| 3 | 42 | 40 | 13 | 5 | — | 1.55 | 25 | 454 |
| 4 | 42 | 40 | 14 | 4 | — | 1.55 | 25 | 454 |
| 5 | 42 | 40 | 15 | 3 | — | 1.55 | 25 | 454 |
| 6 | 42 | 40 | 16 | 2 | — | 1.55 | 25 | 452 |
| 7 | 42 | 40 | 17 | 1 | — | 1.55 | 25 | 452 |
| 8 | 42 | 40 | 13 | 3 | 2 | 1.57 | 26 | 442 |

Each marker material having a dimension of about 38.1 mm×12.7 mm×20 μm was tested by a conventional B-H loop tracer to measure the quantity $H_a$ and then was placed in a sensing coil with 221 turns. An ac magnetic field was applied along the longitudinal direction of each alloy marker with a dc bias field changing from 0 to about 20 Oe. The sensing coil detected the magneto-mechanical response of the alloy marker to the ac excitation. These marker materials mechanically resonate between about 48 and 66 kHz. The quantities characterizing the magneto-mechanical response were measured and are listed in Table IV for the alloys listed in Table III.

TABLE IV

Values of $H_a$, $V_m$, $H_{b1}$, $(f_r)_{min}$, $H_{b2}$ and $df_r/dH_b$ taken at $H_b = 6$ Oe for the alloys of Table III heat-treated at 375° C. for 15 min in a magnetic field of about 1.4 kOe applied perpendicular to the ribbon length direction (indicated by asterisks). Alloys No. 1, 2 and 8 were field annealed in a reel-to-reel anealing furnace at 380° C. with a ribbon speed of about 0.6 m/mimute.

| Alloy No. | $H_a$ (Oe) | $V_m$ (mV) | $H_{b1}$ (Oe) | $(f_r)_{min}$ (kHz) | $H_{b2}$ (Oe) | $df_r/dH_b$ (Hz/Oe) |
|---|---|---|---|---|---|---|
| 1 | 20 | 415 | 8.0 | 53.5 | 17.0 | 610 |
| 2 | 20 | 350 | 9.0 | 52.3 | 16.2 | 620 |
| 3 | 21 | 330 | 7.5 | 50.8 | 18.5 | 470 |
| 4 | 20 | 375 | 9.0 | 50.5 | 17.2 | 540 |
| 5 | 21 | 320 | 8.5 | 51.3 | 18.7 | 420 |
| 6 | 21 | 320 | 8.8 | 51.5 | 18.5 | 490 |
| 7 | 20 | 330 | 8.5 | 51.0 | 18.2 | 550 |
| 8 | 20 | 325 | 9.0 | 54.8 | 17.0 | 550 |

All the alloys listed in Table IV exhibit $H_a$ values exceeding 8 Oe, which make them possible to avoid the interference problem mentioned above. Good sensitivity ($df_r/dH_b$) and large response signal ($V_m$) result in smaller markers for resonant marker systems.

Example 2: Co—Fe—Ni—Mo/Cr/—B—Si—C Metallic Glasses

Glassy metal alloys in the Co—Fe—Ni—Mo/Cr/—B—Si—C system were prepared and characterized as detailed under Example 1. Table V lists chemical compositions, magnetic and thermal properties and Table VI lists quantities characterizing mechanical resonance responses of the alloys of Table V.

TABLE V

Magnetic and thermal properties of low cobalt containing glassy alloys. $T_c$ is the first crystallization temperature.

| Alloy No. | Composition (at. %) | | | | | | | | $B_s$ (Tesla) | $\lambda_s$ (ppm) | $T_c$ (°C) |
|---|---|---|---|---|---|---|---|---|---|---|---|
| | Co | Fe | Ni | Mo | Cr | B | Si | C | | | |
| 1 | 41 | 40 | — | 1 | — | 13 | 5 | — | 1.51 | 24 | 463 |
| 2 | 41 | 38 | — | 3 | — | 13 | 5 | — | 1.34 | 20 | 467 |
| 3 | 41 | 40 | — | — | 1 | 13 | 5 | — | 1.51 | 24 | 460 |
| 4 | 41 | 38 | — | — | 3 | 13 | 5 | — | 1.37 | 20 | 463 |
| 5 | 40 | 40 | 2 | — | — | 13 | 5 | — | 1.53 | 27 | 456 |
| 6 | 43 | 35 | 3 | — | — | 13 | 4 | 2 | 1.50 | 19 | 468 |
| 7 | 40 | 38 | 4 | — | — | 13 | 5 | — | 1.50 | 23 | 456 |

TABLE VI

Values of $H_a$, $V_m$, $H_{b1}$, $(f_r)_{min}$, $H_{b2}$ and $df_r/dH_b$ taken at $H_b = 6$ Oe for the alloys listed in Table V heat-treated at 380° C. in a reel-to-reel annealing furnace with a ribbon speed of about 0.6 m/minute.

| Alloy No. | $H_a$ (Oe) | $V_m$ (mV) | $H_{b1}$ (Oe) | $(f_r)_{min}$ (kHz) | $H_{b2}$ (Oe) | $df_r/dH_b$ (Hz/Oe) |
|---|---|---|---|---|---|---|
| 1 | 18 | 400 | 8.0 | 52.3 | 15.3 | 730 |
| 2 | 14 | 270 | 6.0 | 56.3 | 12.4 | 940 |
| 3 | 18 | 330 | 8.5 | 52.6 | 16.5 | 720 |
| 4 | 16 | 320 | 7.3 | 53.9 | 13.8 | 860 |
| 5 | 20 | 250 | 8.0 | 54.7 | 15.2 | 590 |
| 6 | 19 | 330 | 8.2 | 56.7 | 16.0 | 500 |
| 7 | 20 | 420 | 9.3 | 53.8 | 16.4 | 500 |

All the alloys listed in Table VI exhibit $H_a$ values exceeding 8 Oe, which make them possible to avoid the interference problems mentioned above. Good sensitivity ($df_r/dH_b$) and large magneto-mechanical resonance response signal ($V_m$) result in smaller markers for resonant marker systems.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. A magnetic metallic glass alloy that is at least about 70% glassy, having a composition consisting essentially of the formula $Co_aFe_bNi_cM_dB_eSi_fC_g$, where M is selected from molybdenum and chromium and "a", "b", "c", "d", "e", "f" and "g" are in atom percent, "a" ranges from about 40 to about 43, "b" ranges from about 35 to about 42 and "c" ranges from 0 to about 5, "d" ranges from 0 to about 3, "e" ranges from about 10 to about 25, "f" ranges from about 0 to about 15 and "g" ranges from 0 to about 2.

2. An alloy as recited by claim 1, having the form of a strip that exhibits mechanical resonance in a range of frequencies from about 48 kHz to about 66 kHz, and having a relatively linear magnetization behavior up to a minimum bias field of about 8 Oe.

3. An alloy as recited by claim 2, wherein the slope of the mechanical resonance frequency versus bias field at about 6 Oe is close to or exceeds about 400 Hz/Oe.

4. An alloy as recited by claim 2, wherein the bias field at which the mechanical resonance frequency takes a minimum is close to or exceeds about 8 Oe.

5. An alloy as recited by claim 2, wherein M is molybdenum

6. An alloy as recited by claim 2, wherein M is chromium.

7. An alloy as recited by claim 2, wherein "a" ranges from about 40 to about 43, the sum of "b" plus "c" ranges from about 35 and to about 42, and the sum of "e" plus "f" plus "g" ranges from about 15 to about 25.

8. The magnetic alloy of claim 7, having a composition selected from the group consisting of $Co_{42}Fe_{40}B_{11}Si_7$, $Co_{42}Fe_{40}B_{12}Si_6$, $Co_{42}Fe_{40}B_{13}Si_5$, $Co_{42}Fe_{40}B_{14}Si_4$, $Co_{42}Fe_{40}B_{15}Si_3$, $Co_{42}Fe_{40}B_{16}Si_2$, $Co_{42}Fe_{40}B_{17}Si_1$, $Co_{42}Fe_{40}B_{13}Si_3C_2$, $Co_{40}Fe_{40}Ni_2B_{13}Si_5$, $Co_{40}Fe_{38}Ni_4B_{13}Si_5$, $Co_{41}Fe_{40}Mo_1B_{13}Si_5$, $Co_{41}Fe_{38}Mo_3B_{13}Si_5$, $Co_{41}Fe_{40}Cr_1B_{13}Si_5$, $Co_{41}Fe_{38}Cr_3B_{13}Si_5$, and $Co_{43}Fe_{35}Ni_3B_{13}Si_4C_2$, wherein subscripts are in atom percent.

9. In an article surveillance system adapted to detect a signal produced by mechanical resonance of a marker within an applied magnetic field, the improvement wherein said marker comprises at least one strip of ferromagnetic material that is at least about 70% glassy, and has a composition consisting essentially of the formula $Co_aFe_bNi_cM_dB_eSi_fC_g$, where M is selected from molybdenum and chromium and "a", "b", "c", "d", "e", "f" and "g" are in atom percent, "a" ranges from about 40 to about 43, "b" ranges from about 35 to about 42 and "c" ranges from about 0 to about 5, "d" ranges from about 0 to about 3, "e" ranges from about 10 to about 25, "f" ranges from about 0 to about 15 and "g" ranges from about 0 to about 2.

10. An article surveillance system as recited by claim 9, wherein said strip is selected from the group consisting of ribbon, wire an d sheet.

11. An article surveillance system as recited by claim 10, wherein said strip is a ribbon.

12. An article surveillance system as recited by claim 9, wherein said strip exhibits mechanical resonance in a range of frequencies from about 48 kHz to about 66 kHz, and a relatively linear magnetization behavior up to a bias field of at least 8 Oe.

13. An article surveillance system as recited by claim 12, wherein the slope of the mechanical resonance frequency versus bias field exhibited by said strip at about 6 Oe is close to or exceeds about 400 Hz/Oe.

14. An article surveillance system as recited by claim 12, the bias field at which the mechanical resonance frequency of said strip takes a minimum is close to or exceeds about 8 Oe.

15. An article surveillance system as recited by claim 12, wherein M is molybdenum.

16. An article surveillance system as recited by claim 12, wherein M is the element chromium.

17. An article surveillance system as recited by claim 12, wherein "a" ranges from about 40 to about 43, the sum of "b" plus "c" ranges from about 35 and to 42, and the sum of "e" plus "f" plus "g" ranges from about 15 to about 25.

18. An article surveillance system as recited by claim 17, wherein said strip has a composition selected from the group consisting of $Co_{42}Fe_{40}B_{11}Si_7$, $Co_{42}Fe_{40}B_{12}Si_6$, $Co_{42}Fe_{40}B_{13}Si_5$, $Co_{42}Fe_{40}B_{14}Si_4$, $Co_{42}Fe_{40}B_{15}Si_3$, $Co_{42}Fe_{40}B_{16}Si_2$, $Co_{42}Fe_{40}B_{17}Si_1$, $Co_{42}Fe_{40}B_{13}Si_3C_2$, $Co_{40}Fe_{40}Ni_2B_{13}Si_5$, $Co_{40}Fe_{38}Ni_4B_{13}Si_5$, $Co_{41}Fe_{40}Mo_1B_{13}Si_5$, $Co_{41}Fe_{38}Mo_3B_{13}Si_5$, $Co_{41}Fe_{40}Cr_1B_{13}Si_5$, $Co_{41}Fe_{38}Cr_3B_{13}Si_5$ and $Co_{43}Fe_{35}Ni_3B_{13}Si_4C_2$, wherein subscripts are in atom percent.

* * * * *